United States Patent [19]

Robbins, III

[11] Patent Number: 5,667,106
[45] Date of Patent: Sep. 16, 1997

[54] CONTAINER CAP WITH A MEASURING SPOUT

[75] Inventor: Edward S. Robbins, III, Florence, Ala.

[73] Assignee: E. S. Robbins Corporation, Muscle Shoals, Ala.

[21] Appl. No.: 484,701

[22] Filed: Jun. 7, 1995

[51] Int. Cl.$^6$ ................................................. G01F 11/10
[52] U.S. Cl. .................................... 222/158; 222/364
[58] Field of Search ............................... 222/158, 284, 222/362, 363, 364

[56] References Cited

U.S. PATENT DOCUMENTS

| | | | |
|---|---|---|---|
| 1,178,401 | 4/1916 | Lilly | 222/364 |
| 1,411,000 | 3/1922 | Condon | 222/364 X |
| 1,710,119 | 4/1929 | Smith | 222/364 |
| 1,752,527 | 4/1930 | Howard | 222/364 |
| 2,069,281 | 2/1937 | Sebreny | 222/364 X |
| 2,104,332 | 1/1938 | Rohde et al. | 222/363 |
| 2,611,516 | 9/1952 | Beldner | 222/363 X |
| 3,036,742 | 5/1962 | Wagoner et al. | 222/158 |
| 3,077,213 | 2/1963 | Germano | 222/158 |
| 3,209,961 | 10/1965 | Wassell | 222/158 |
| 3,456,852 | 7/1969 | Linn | 222/284 |
| 3,985,274 | 10/1976 | Lubalin et al. | 222/362 |
| 4,144,989 | 3/1979 | Joy | 222/438 |
| 4,161,265 | 7/1979 | Hauser et al. | 222/363 X |
| 4,261,483 | 4/1981 | Dutcher | 222/364 |
| 4,318,500 | 3/1982 | Melikian | 222/425 |
| 4,767,027 | 8/1988 | Lewinter et al. | 222/158 |

FOREIGN PATENT DOCUMENTS

| | | | |
|---|---|---|---|
| 72452 | 4/1960 | France | 222/364 |
| 92/19941 | 11/1992 | WIPO | 222/284 |

Primary Examiner—Andres Kashnikow
Assistant Examiner—Kenneth Bomberg
Attorney, Agent, or Firm—Locke Reynolds

[57] ABSTRACT

A cap for use with an associated container comprises a measuring spout which is wholly contained inside the cap and does not protrude into the container. The cap comprises a cap wall which is adapted to provide an opening in which the spout is seated. The spout comprises a forward wall and at least one side wall which forms an open-topped hopper. The spout pivots between a closed, filling position and an open, dispensing position. The spout is formed from a visually translucent material, such as any of a number of commonly available plastics. Volumetric measuring indicia are disposed on an outer surface of the forward wall of the spout, thereby allowing a user to determine and adjust the desired volume of the material prior to discharge of the material from the spout. The cap is also provided with upwardly and inwardly tapered portions which guide the material into the hopper. In use, the container-cap assembly may be tilted while the spout is in the closed position, so as to fill the hopper with a predetermined amount of particulate solid material from the container. The spout may then be opened to allow the user to dispense the desired volume of the material from the spout.

18 Claims, 7 Drawing Sheets

CONTAINER CAP WITH A MEASURING SPOUT

BACKGROUND OF THE INVENTION

1. Field of the Invention

The present invention relates generally to caps for containers that store various particulate solids, and more particularly to container caps which have spouts which are capable of dispensing a measured amount of the particulate solid from the container.

2. Description of the Prior Art

The prior art teaches various container caps that are capable of dispensing a measured portion of a particulate solid from the container. For example, in U.S. Pat. No. 3,985,274, Lubalin et al. teach a dispenser-cover adapted to replace caps on containers for particulate materials. According to Lubalin, a pre-determined volume of a particulate solid may be dispensed. In addition, in U.S. Pat. No. 4,144,989, Joy discloses a granular material dispenser which contains a fixed chamber with a divider for metering out particulate material. According to Joy, a single, pre-determined amount of material may be poured with each pouring step, while a baffle must be adjusted in order to change the amount of particulate material dispensed.

Despite the availability of such dispensers, it will be appreciated that there exists a need in the art for a simple, low-cost, measuring cap which enables a user to dispense various precisely measured amounts of particulate solid contents from an associated container, and which allows the user to adjust various measured dispensed amounts from a single spout. In addition, the foregoing prior art approaches fail to provide a dispenser in which material is easily transferred into the dispensing spout.

SUMMARY OF THE INVENTION

The aforesaid problems are solved, in accordance with the present invention, by a container cap which has a volumetric measuring spout and which is capable of easily transferring material into and out from the measuring spout. The measuring spout is wholly contained within the cap and does not project into the container body. The cap comprises a cap wall which is adapted to provide an orifice in which the spout is seated. The spout comprises a forward, outside wall and at least one inside wall which defines an open-topped hopper. The spout pivots between open and closed positions. Accordingly, the forward wall of the spout closes the orifice of the spout while in the closed position, and the forward wall opens the orifice of the spout while in the open position. In use, the hopper may be filled with a particulate solid material, for example a hygroscopic material, from the container while the spout is in the closed position, and the material may be dispensed from the spout while the spout is in the open position.

The interior of the cap is also provided with opposed tapered portions which lead to the hopper. More specifically, the opposed tapered portions are upwardly and inwardly tapered so as to facilitate filling of the hopper with material from the container by guiding, or "funneling", the material into the hopper.

The cap is formed of a visually translucent material, as perhaps any of a number of resilient, commonly available plastics. The forward, outside wall of the spout is provided with appropriate volumetric indicia which allow a user to determine and adjust the volume of the material in the spout prior to dispensing. The inside wall, or inside walls if applicable, may also be provided with such volumetric measuring indicia.

Accordingly, the present invention provides a simple, economical and easy-to-use container cap of a type which has heretofore been unavailable in the art. The container cap of the present invention advantageously allows a user to easily transfer particulate solid materials from the container to the dispensing spout. The present invention is also capable of providing many volumetric graduations on a single spout, thereby allowing a user to dispense a variety of different amounts from a single spout. In addition, the present invention permits the user to adjust various amounts of material in the spout prior to dispensing.

The present invention will be more fully understood upon reading the following detailed description of the preferred embodiments in conjunction with the accompanying drawings.

DETAILED DESCRIPTION OF THE PREFERRED EMBODIMENT

Figure 1:
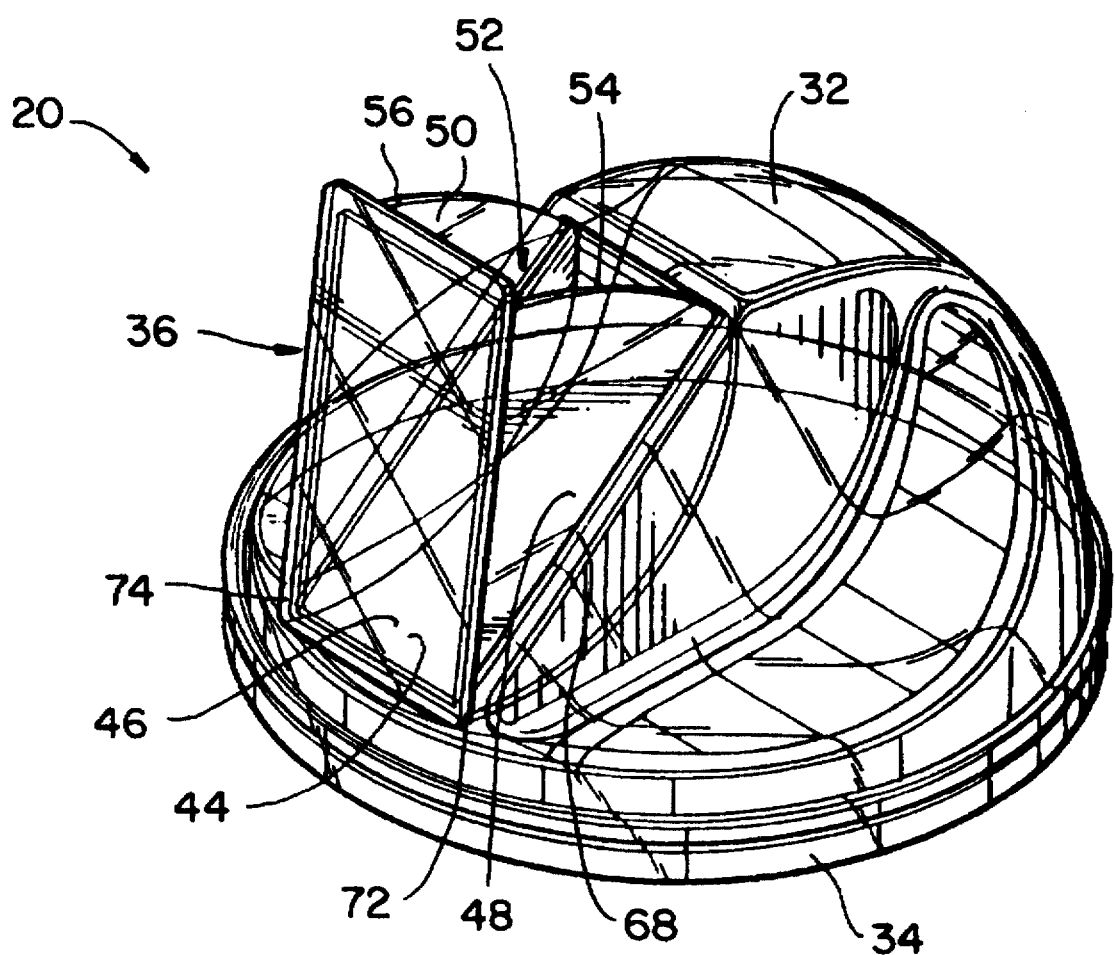
FIG. 1 is a perspective view of a cap in accordance with the present invention, with a spout of the cap in an open position.

The following portion of the specification, taken in conjunction with the drawings, sets forth the preferred embodiment of the present invention. The embodiment of the invention disclosed herein is the best mode contemplated by the inventors for carrying out the invention in a commercial environment, although it should be understood that various modifications can be accomplished within the parameters of the present invention.

Referring now to the drawings for a detailed description of the present invention, reference is first made to FIGS.

Figure 2:
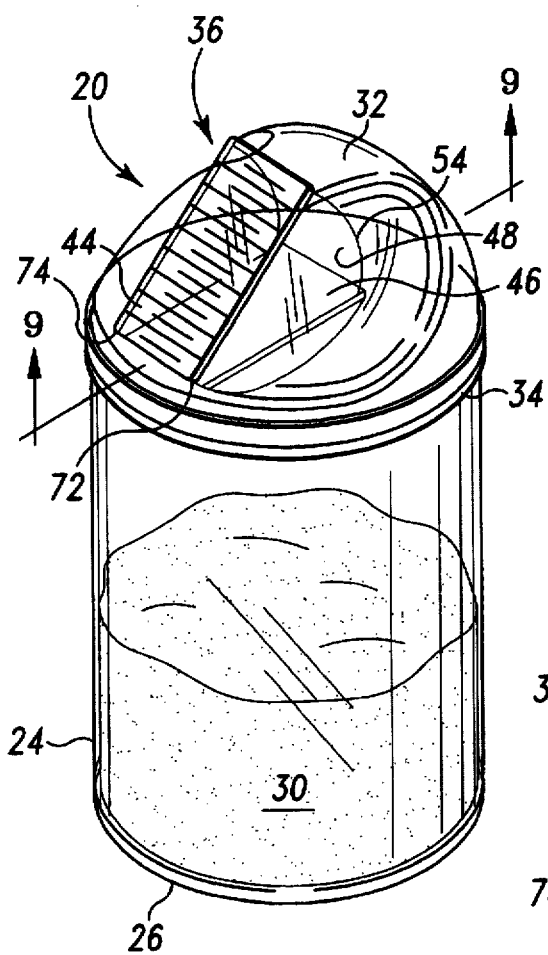
FIG. 2 is a perspective view of a cap as shown in FIG. 1 as disposed on an associated container, but with the spout of the cap in a closed position and showing volumetric indicia on the spout, in accordance with the present invention.
Figure 3:
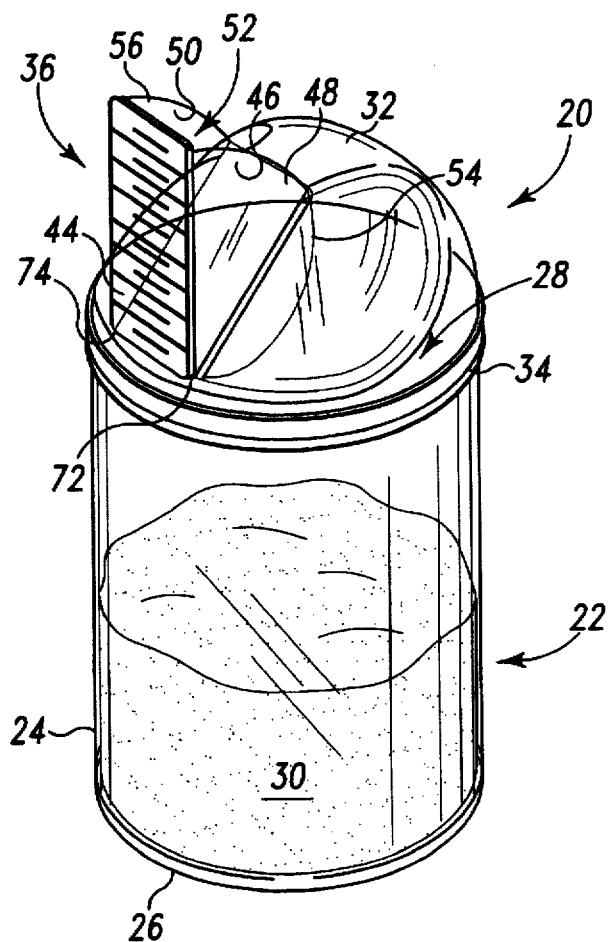
FIG. 3 is a perspective view of a cap and associated container as shown in FIG. 2, but with the spout in an open position.
Figure 4:
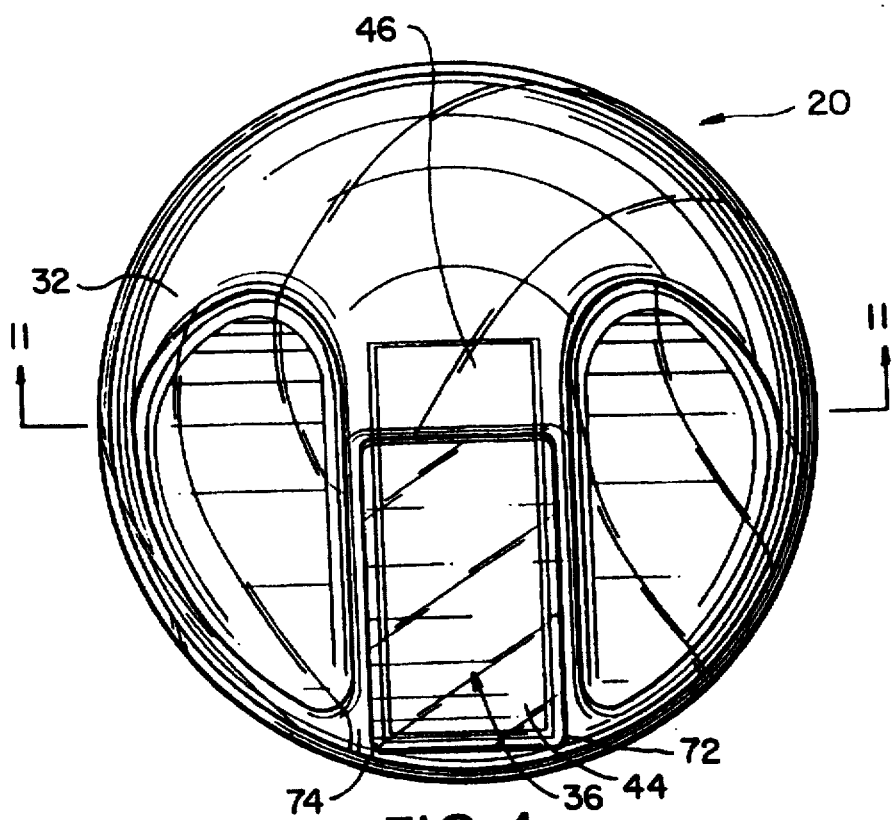
FIG. 4 is a top plan view of the cap shown in FIG. 1.

1–8, generally depicting a cap 20 in accordance with the present invention. As shown in FIGS. 2–3, the cap 20 is disposed on an associated container body 22. The container 22 comprises a cylindrical side wall 24, a planar bottom wall 26, and a mouth portion 28 which is adapted to receive a closure. Inside the container is a particulate solid 30, for example a hygroscopic particulate. The container 22 may be formed from a variety of materials, including but not limited to metal, plastic, and cardboard. In addition, the container 22 may also be in any of a variety of forms, including but not limited to cans, bottles, and boxes.

The cap 20 is formed of a visually translucent material such as any of a number of commonly available resilient plastics. The cap 20 comprises a cap wall 32 which has a lower perimetral edge 34 which mates with the mouth portion 28 of the associated container body 22. One of ordinary skill in the art will appreciate that the lower perimetral edge 34 of the cap 20 and the mouth portion 28 of container body 22 may be connected by various means. For example, if container body 22 is a can, the cap 20 may be adapted to snap onto the container 22. Conversely, if the container 22 is a bottle, then the cap 20 may be adapted to screw onto the container 22. The size and shape of the lower perimetral edge 34 may vary to accommodate mating with containers of varying sizes and shapes.

Figure 11:
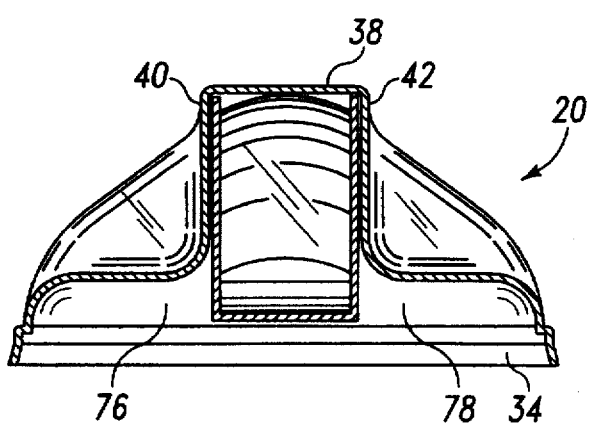
FIG. 11 is a cross-sectional view of the cap as shown in FIG. 4, taken along line 11—11.

The cap wall 32 also comprises a second edge which defines an orifice in which a spout 36 is seated. The orifice is of a size and shape which accommodates the size and shape of the pivotable spout 36, which may vary. As shown, the second edge defines a rectangular configuration, and accordingly, the orifice is also rectangular. As seen in FIG. 11, the second edge comprises a top portion 38, a pair of side portions 40 and 42, and a bottom portion (not shown).

The spout 36 comprises a forward, outside wall 44, as well as a rear wall 46 and side walls 48 and 50, which form an open-topped hopper 52. The rear wall 48 may therefore function as a bottom wall for the hopper 52. The side walls 48 and 50 are provided with radiused upper edges 54 and 56, respectively, which permit the hopper 52 to move between open and closed positions, as described hereinbelow.

The forward, outside wall 44 is provided with appropriate volumetric indicia which permit a user to determine the amount of material in the hopper 52, as shown in FIGS. 2–3. The indicia may be optionally extended to the side walls 48 and 50, as well. The units selected for the graduated indicia may vary depending upon the nature of material in the container 22 and the size of the container 22. By way of example, the graduated units may be in teaspoons, tablespoons, cups, or milliliters, as well as other units. Because the cap 20 is translucent, the user will be able to readily determine the volume of material in the hopper 52, even while spout 36 is in the closed position.

Figure 9:
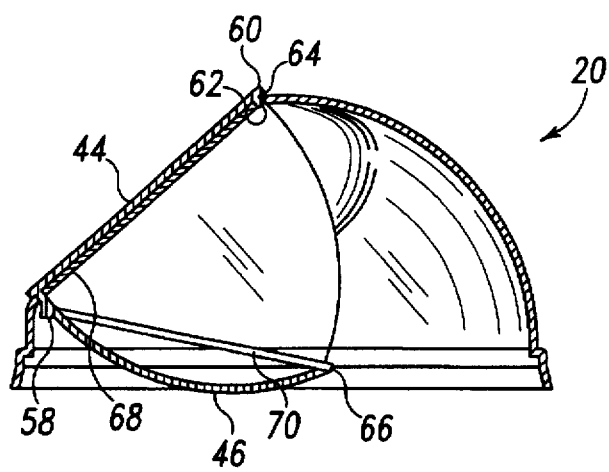
FIG. 9 is a side cross-sectional view of the cap portion of FIG. 2, taken along line 9—9.
Figure 10:
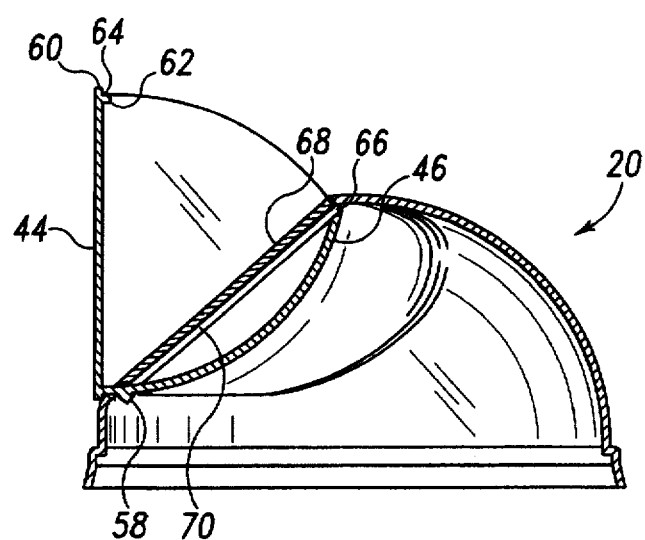
FIG. 10 is a side cross-sectional view of the cap as shown in FIG. 9, but with the spout in an open position.

Referring now to FIGS. 9–10, the spout 36 is provided with a pivotal point 58 which is adjacent to the bottom portion of the second edge of the cap wall 32. The pivotal point 58 may be in the form of a V-notch, and the pivotal point 58 accommodates a two-piece cap 20, thereby minimizing expense and complexity in the manufacture of the cap 20, as perhaps by injection molding. In the two-piece cap, the spout 36 may be adapted to snap into place. The pivotal point 58 allows the forward wall 44 to pivot between open and closed positions. More specifically, the forward wall 44 may be pivoted to close the orifice in which the spout 36 is seated and thereby configure the cap 20 for a "filling" operation. After filling the hopper 52 with a desired amount of material from the container 22 (as described hereinbelow), the forward wall 44 may then be pivoted to re-open the orifice and thereby configure cap 20 for a "dispensing" operation. The spout 36 is wholly contained inside the cap 20 at all times, as the spout does not project into the container 22 while in either the open or closed positions.

The dimensions of the forward wall 44 are preferably larger than the dimensions of the orifice in which the spout 36 is situated. The larger dimensions enable the forward wall 44 to fully enclose the spout 36 within cap 20 while the spout 36 is in the retracted, or "filling", position. Accordingly, the forward wall 44 extends upwardly beyond top portion 38 of the second edge which defines the orifice, thereby forming a front lip 60. As seen in FIGS. 9 and 10, a stop 62 is preferably provided adjacent and perpendicular to the front lip 60 of the forward wall 44. The stop 62 prevents further movement of the forward wall 44 upon closing of the spout 36, as seen in FIG. 9. The front lip 60 and the stop 62 together define a narrow groove 64. While the cap 20 is in the closed position, groove 64 facilitates movement of the spout 36 to the open position shown in FIG. 10. More specifically, a user may insert a fingernail or other narrow object into groove 64 so as to lift forward wall 44 into the open position. It is noted that stop 62 may be omitted, with the front lip 60 acting to serve as the stopping means for maintaining the spout 36 in the filling position.

Rear wall 46 likewise extends longitudinally beyond the orifice defined in the cap wall 32, thereby creating a rear lip 66. Rear lip 66 operates as a stopping means for preventing the spout 36 from further movement when the spout 36 reaches the open position, as best seen in FIG. 10. The opposite end of rear wall 46 intersects with forward wall 44 near pivotal point 58.

As seen in FIGS. 9–10, a flexible sealing means 68 may be preferably provided on the second edge of cap wall 32, adjacent to side walls 48 and 50 of spout 36. Specifically, each sealing means 68 (only one is shown) is disposed on the side portions 40 and 42 of the second edge of the cap wall 32 which defines the orifice in which the spout 36 is seated. Each sealing means 68 is provided to attenuate the cap's 20 susceptibility to spillage by substantially closing a gap which may otherwise exist between the side portions 40 and 42 of the second edge of the cap wall 32 and the respective adjacent side walls 48 and 50 of the spout 36.

As best seen in FIGS. 9–10, an outer face of each side wall 48 and 50 may also be preferably provided with a sealing flange 70 (only one is shown), which extends from forward wall 44 to back wall 46. Each sealing flange 70 abuts the adjacent side portions 40 and 42 of the second edge which defines the orifice in which the spout 36 is seated when the cap 20 is in the open position. Particularly, each sealing flange 70 engages with the flexible sealing means 68 disposed on the respective side portions 40 and 42 of the second edge defining the orifice. The sealing flanges 70 in conjunction with the sealing means 68 minimize the cap's 20 susceptibility to spillage through the gap between the respective side portions 40 and 42 of the second edge of the cap wall 32 and the side walls 48 and 50 of the spout 36.

It is noted that spillage is also minimized when cap 20 is in the closed position. More particularly, the dimensions of the forward wall 44 are larger than the orifice in which the spout 36 is seated. As seen in FIGS. 1–4, side edges 72 and 74 of the forward wall 44 therefore enclose the spout 36 within the cap 20. In the closed position, the side edges 72 and 74 of the forward wall 44 reinforce the sealing means 68 to attenuate susceptibility to spillage.

Figure 5:
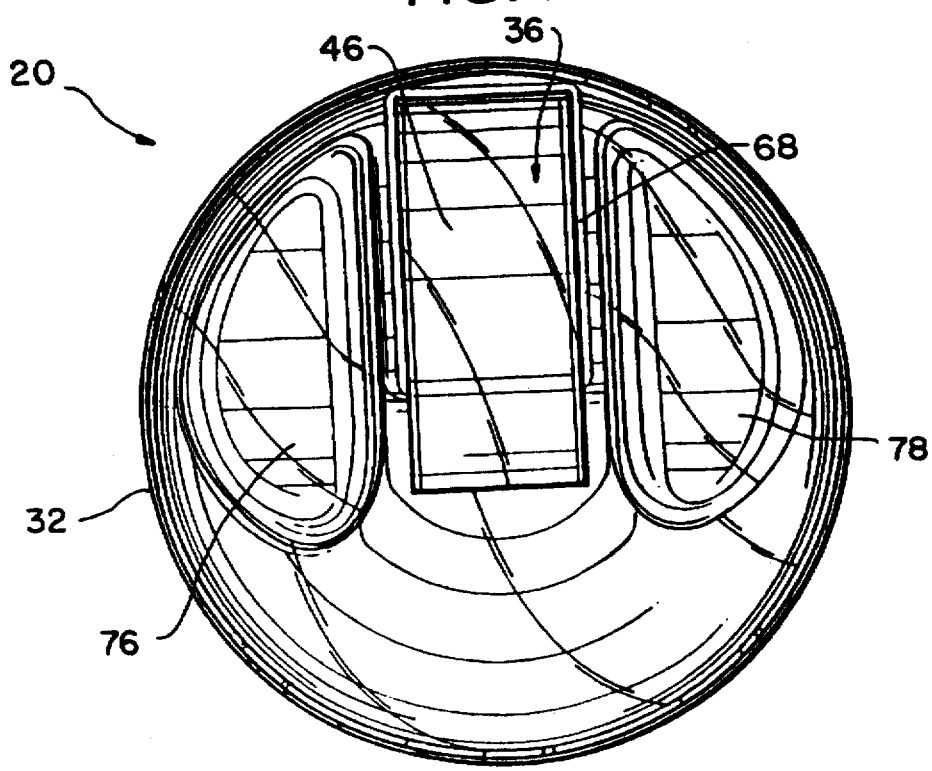
FIG. 5 is a bottom plan view of the cap shown in FIG. 1.
Figure 6:
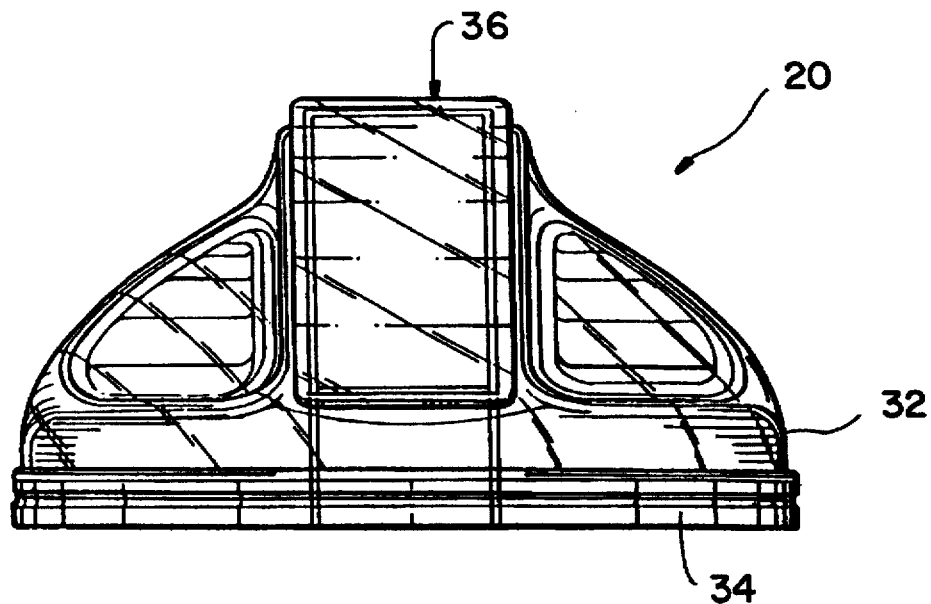
FIG. 6 is a front elevation view of the cap shown in FIG. 1, but with the spout in the closed position.
Figure 7:
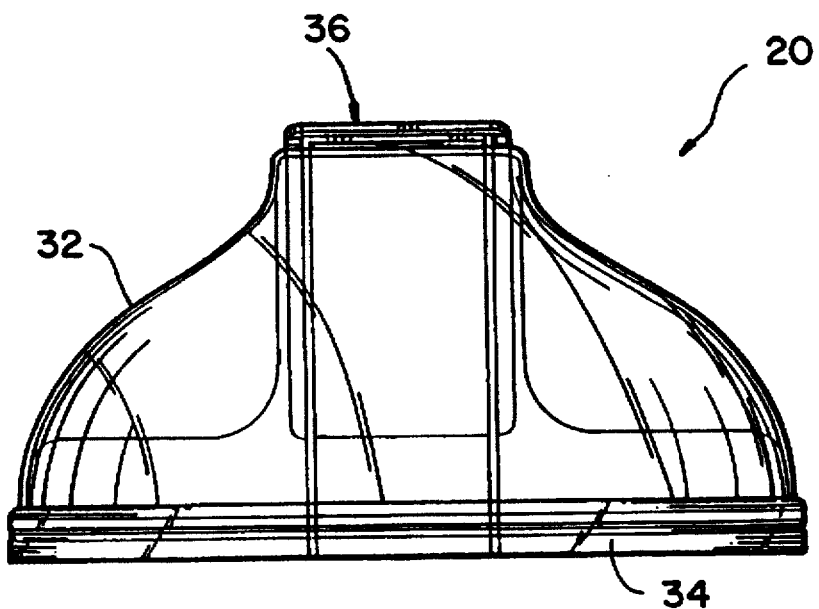
FIG. 7 is a rear elevation view of the cap shown in FIG. 1, but with the spout in the closed position.
Figure 12:
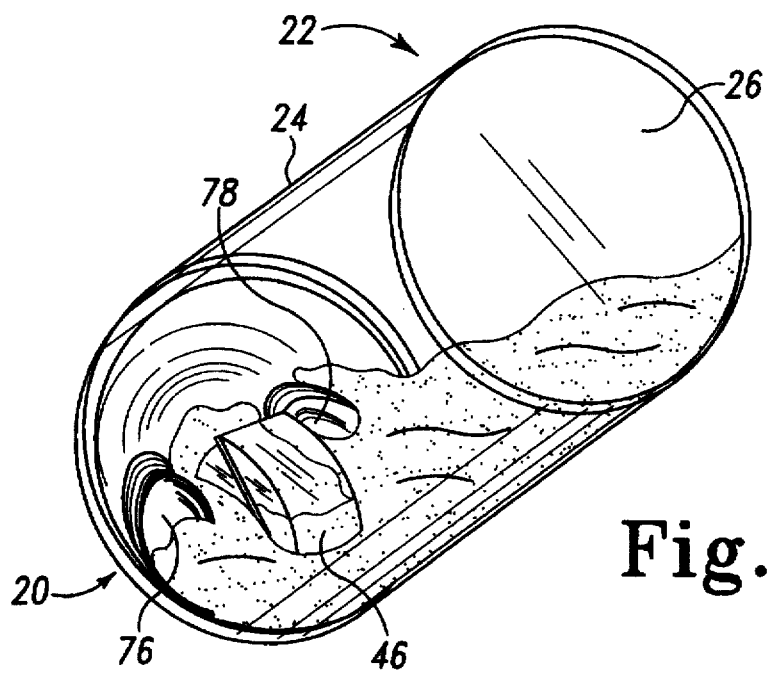
FIG. 12 is a bottom perspective view of the container-cap assembly of FIG. 2, shown in a tilted mode, illustrating the filling operation into the hopper of the cap, in accordance with the present invention.

As best seen in FIGS. 5 and 11–12, the inside surface of the cap wall 32 is provided with opposed tapered portions 76 and 78 which lead to the hopper 52. The opposed tapered portions 76 and 78 are tapered upwardly and inwardly and critically serve to facilitate filling of the hopper 52 by guiding, or "funneling", material into the hopper 52, as described in more detail hereinbelow.

Figure 8:
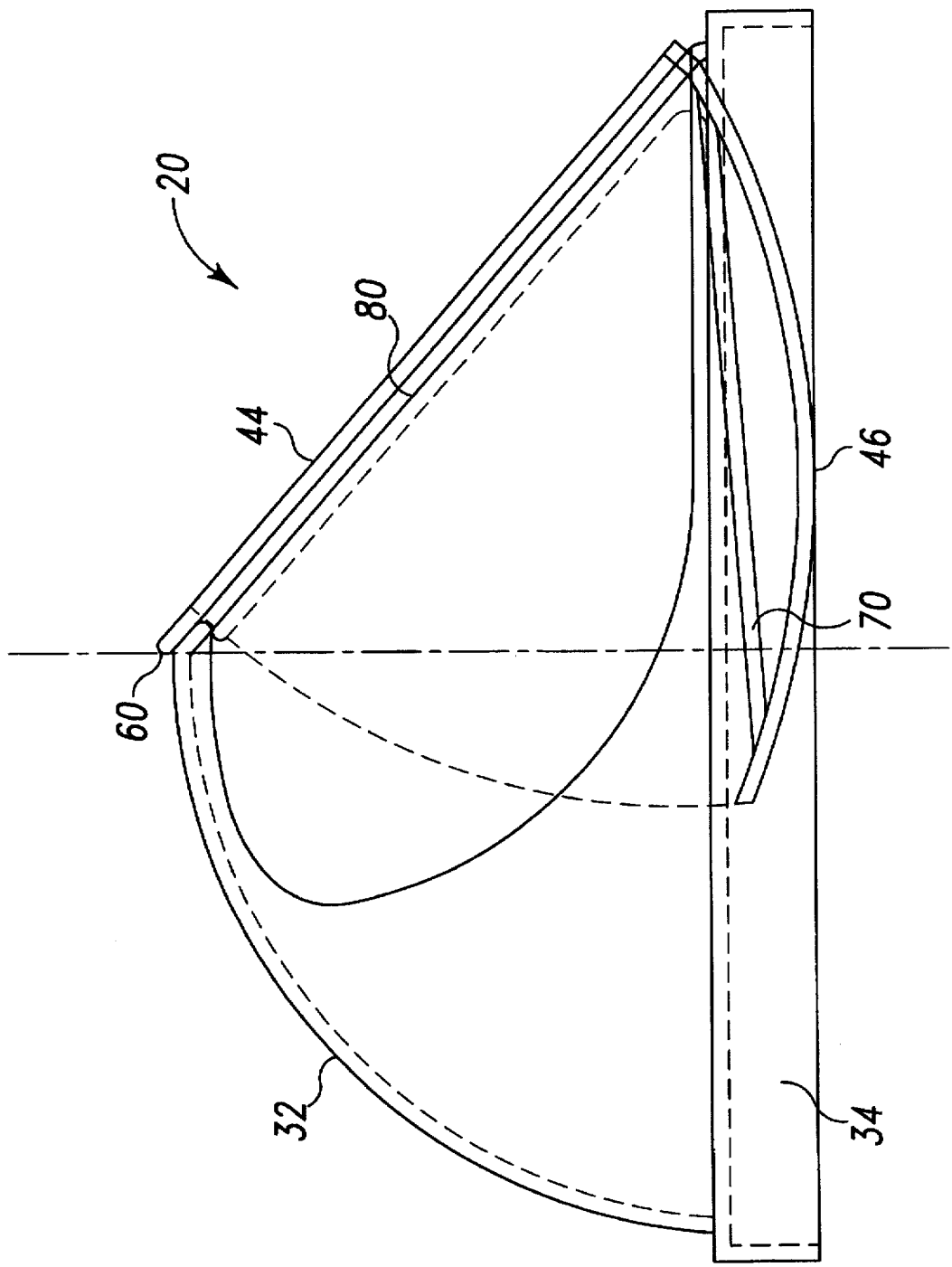
FIG. 8 is an enlarged side view of the cap shown in FIG. 1, but with the spout in a closed position.

As shown in FIG. 8, the side walls 48 and 50 of the hopper 52 may preferably be provided with a bead 80, which serves as a seal for inhibiting air flow into the container 22 while the spout 36 is in the closed filling position. The bead 80 may be particularly advantageous when the cap 20 is utilized with containers 22 which contain hygroscopic particulates, where exposure to air may be deleterious to the particular hygroscopic material in the container 22. Hygroscopic particulates, such as sugar and sugar-based particulates; undesirably absorb moisture from air thereby causing unwanted clumping, or "clotting", of the solid particulate. Accordingly, minimizing the container 22 to exposure to moisture-laden air is important for ensuring the quality of ultimately dispensed hygroscopic particulates. The bead 80 may also be provided on the lower perimetral edge 34 to enhance the air-tight environment. The bead 80 may also hold the hopper 52 in place. For example, a portion of bead 80 may seal the hopper 52 into the closed position, as shown in FIG. 8, while another portion of the bead 80 may seal the hopper 52 in the open position.

In operation, the user may fill or partially fill the hopper 52 while the cap 20 is in the closed or retracted position, as shown in FIG. 12. More specifically, the user will tilt the container 22, with the cap 20 appropriately connected thereto, in order to transport the contents 30 of the container 22 toward the tapered portions 76 and 78 of the cap 20. The tapered portions 76 and 78 serve to guide the contents 30 into the open-topped hopper 52. Because the cap 20 is translucent, the user is able to gradually determine the amount of material transported into the hopper 52 by reading the graduated volumetric indicia, even while the cap 20 is in the closed position. If necessary, the user may then adjust the volume retained in the hopper 52, as desired, by tilting the container/cap in a back and forth movement. For example, if too much material enters hopper 52, the user may simply tilt the container-cap appropriately in order to transfer the contents 30 from the hopper 52 and back into the container 22.

Figure 13:
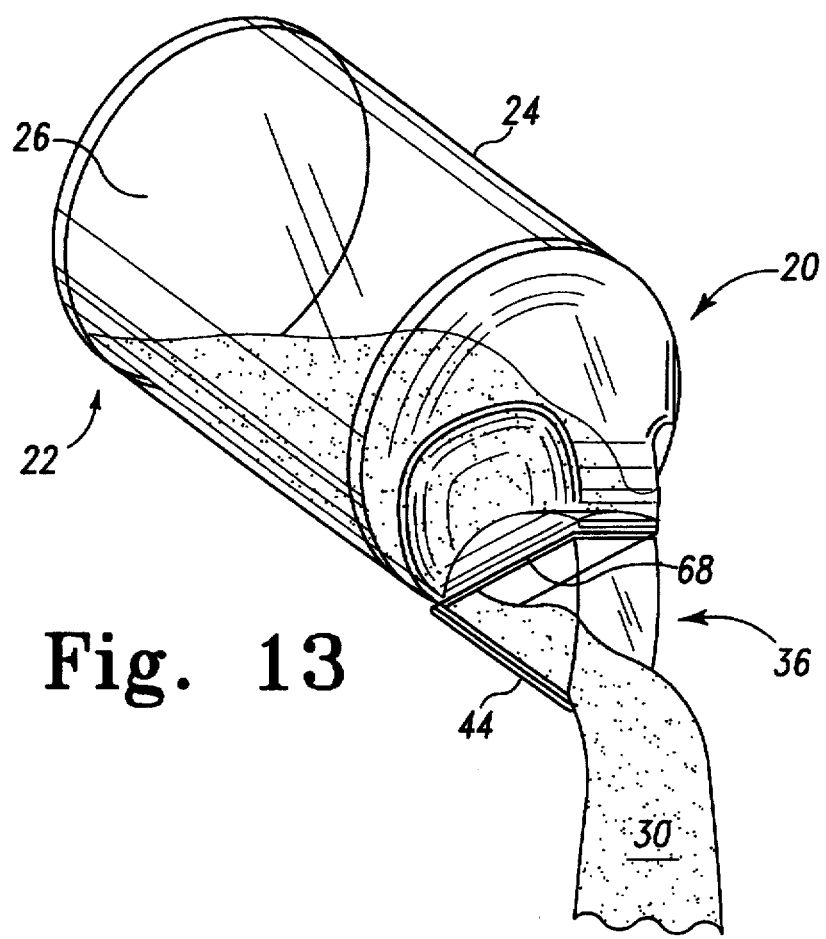
FIG. 13 is a perspective view of the container-cap assembly of FIG. 3, shown in the tilted mode, illustrating the dispensing operation from the spout of the cap, in accordance with the present invention.

After a suitable amount of material 30 is transferred from the container 22 into the hopper 52, the cap 20 may next be transformed from the closed position into the open, or dispensing, position by pivoting the forward wall 44. As shown in FIG. 13, the predetermined measured amount of material 30 may then be dispensed by the spout 36.

While the preferred embodiment of the invention has been disclosed, it should be appreciated that the invention is susceptible of modification without departing from the spirit of the invention or the scope of the subjoined claims. For example, it is noted that the hopper 52 may be formed in a variety of shapes. Accordingly, the shapes and configurations of the side and rear walls may vary. In fact, rather than utilizing side walls 48 and 50 and a rear wall 46 (as shown), the hopper may alternatively be defined by a singular inside wall, which would intersect with forward wall 44 near pivotal point 58, and would also extend from one side edge 72 of forward wall 44 to the other side edge 74. In addition, the position of the orifice in the cap wall 32 in which the spout 36 is seated may also vary, but still be wholly contained within the cap 20.

What is claimed is:

1. A cap having a dispensing spout for use on a container body, the container body including a perimetral edge defining an upper margin of the container body, the cap comprising a cap wall portion having a lower perimetral edge dimensioned to join the container body upper margin, the cap wall further including a second edge defining an opening receiving the dispensing spout, and pivot means coupling the dispensing spout axially and radially adjacent to the lower perimetral edge for pivoting the dispensing spout between a dispensing and a filling position, the dispensing spout having an outside wall for closing said opening when in the filling position and an inside wall defining a hopper, the cap wall being configured to maintain the pivotable spout inside wall at all times above a plane defined by the cap wall lower perimetral edge, the cap wall including opposed upwardly and inwardly tapered portions leading to the hopper to facilitate filling of the hopper.

2. A cap as defined in claim 1, wherein said cap is substantially formed from a plastic material.

3. A cap as defined in claim 1, wherein said cap is substantially formed of a visually translucent material.

4. A cap as defined in claim 1, wherein said cap is substantially formed from a visually translucent plastic material.

5. A cap as defined in claim 1, wherein the spout further comprises volumetric measuring indicia.

6. A cap as defined in claim 5, wherein the volumetric measuring indicia are disposed on the outside wall of the spout.

7. A cap as defined in claim 1, wherein at least the hopper is formed of a visually translucent material.

8. A cap as defined in claim 1, wherein at least a portion of the second edge of the cap wall is provided with a sealing means.

9. A cap as defined in claim 1 further comprising a means for maintaining the spout in the dispensing position.

10. A cap as defined in claim 1 further comprising a means for maintaining the spout in the filling position.

11. A cap as defined in claim 1, wherein the second edge comprises an upper portion, and wherein the outside wall extends beyond the upper portion of the second edge so as to form a front lip which maintains the position of the spout in the filling position.

12. A cap as defined in claim 1, wherein the opposed tapered portions comprise two opposed tapered portions.

13. A cap as defined in claim 1 further comprising means for inhibiting air flow into the container when the spout is in the filling position.

14. A cap as defined in claim 13 wherein at least a portion of the means for inhibiting air flow is provided on the inside wall of the hopper.

15. A cap as defined in claim 14 wherein the means for inhibiting air flow comprises at least one bead.

16. A translucent plastic cap having a dispensing spout for use on a container body including a perimetral edge defining an upper margin of the container body, the cap comprising a cap wall portion having a lower perimetral edge dimensioned to join the container body upper margin, the cap wall further including a second edge defining an opening receiving the dispensing spout, and pivot means coupling the dispensing spout axially and radially adjacent to the lower perimetral edge for pivoting the dispensing spout between a dispensing and a filling position, the dispensing spout having an outside wall for closing said opening when in the filling position and at least one inside wall defining a hopper, the outside wall being provided with volumetric measuring indicia, the cap wall being configured to maintain the at least one inside wall of the pivotable spout at all times above a plane defined by the cap wall lower perimetral edge, the cap wall including opposed upwardly and inwardly tapered portions leading to the hopper to facilitate filling of the hopper.

17. A cap as defined in claim 16 further comprising a means for maintaining the hopper in the dispensing position.

18. A cap as defined in claim 17, wherein the at least one inside wall of the hopper comprises a pair of side walls connected by a rear wall, and wherein the second edge comprises an upper portion, wherein the rear wall extends beyond the upper portion of the second edge so as to form a rear lip which comprises the means for maintaining the position of the spout in the dispensing position.

* * * * *